Nov. 3, 1936.  B. A. WOINA  2,059,924

VENTILATING SYSTEM FOR VEHICLE BODIES

Filed Sept. 28, 1934   3 Sheets-Sheet 1

INVENTOR

BENJAMIN A. WOINA

BY Whittemore Hulbert
Whittemore & Belknap

ATTORNEYS

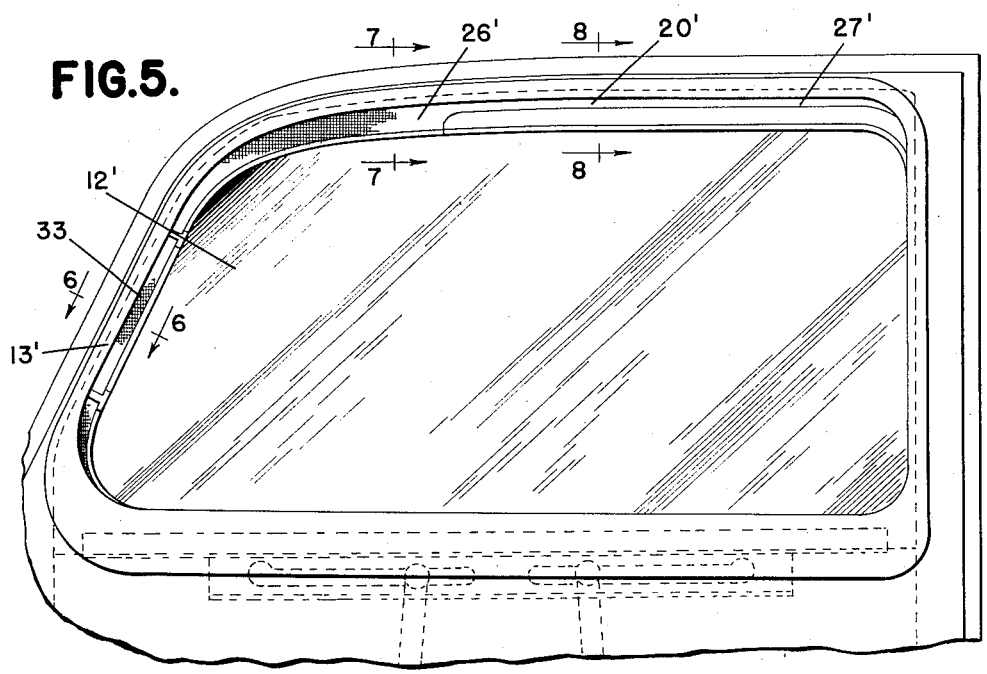
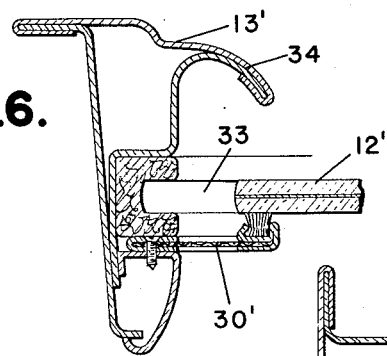
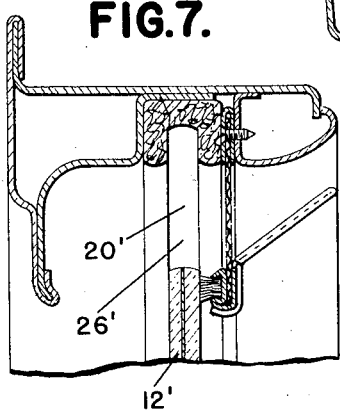
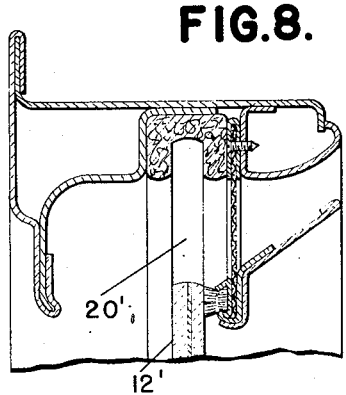

Nov. 3, 1936.　　　　B. A. WOINA　　　　2,059,924
VENTILATING SYSTEM FOR VEHICLE BODIES
Filed Sept. 28, 1934　　　3 Sheets-Sheet 3
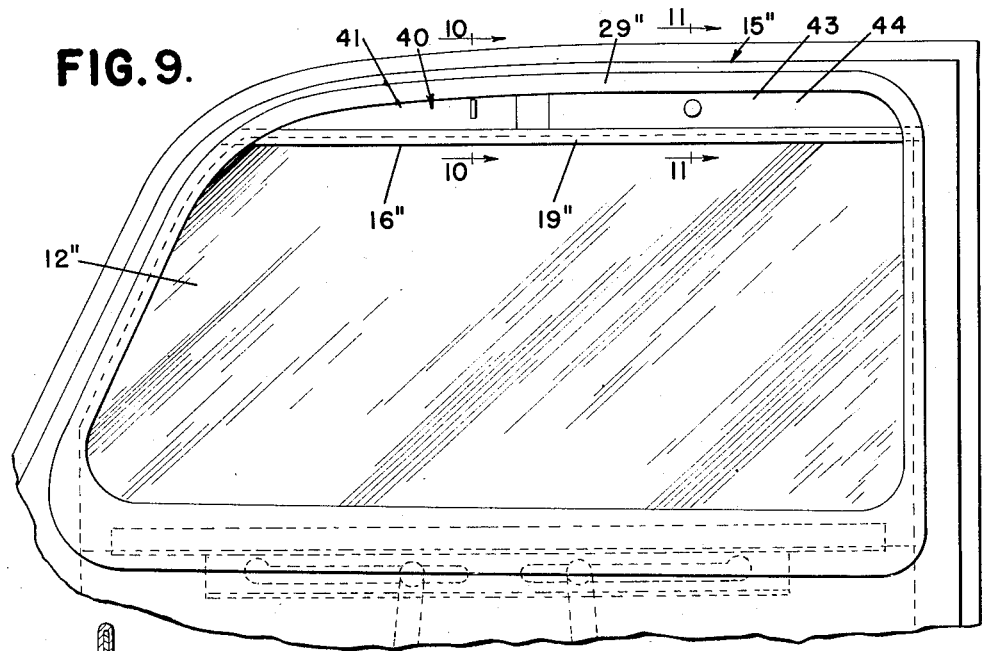
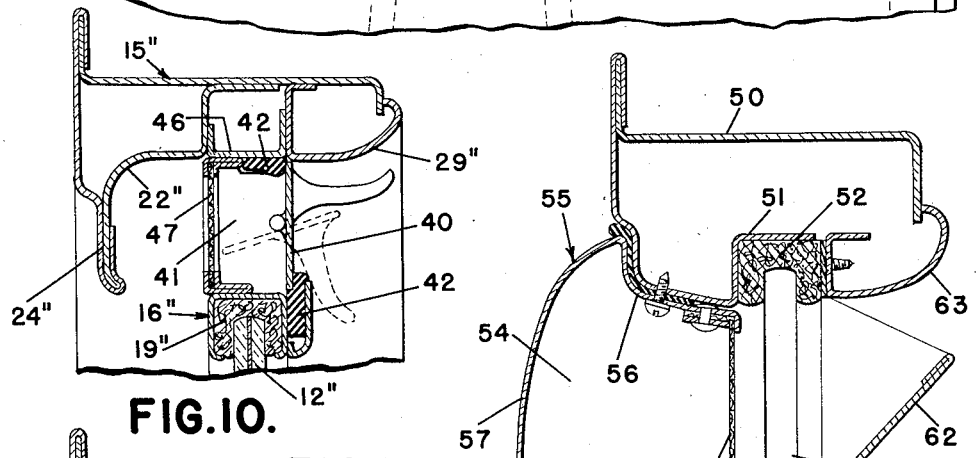
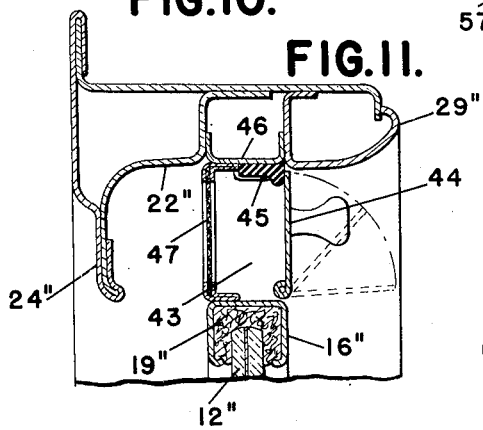
INVENTOR
BENJAMIN A. WOINA
BY Whittemore Hulbert
Whittemore + Belknap
ATTORNEYS Patented Nov. 3, 1936

2,059,924

UNITED STATES PATENT OFFICE 2,059,924

VENTILATING SYSTEM FOR VEHICLE BODIES

Benjamin A. Woina, Detroit, Mich.

Application September 28, 1934, Serial No. 745,990

4 Claims. (Cl. 296—44)

This invention relates generally to ventilating means and refers more particularly to means of this character especially designed for use upon vehicle bodies.

One of the principal objects of this invention consists in providing highly efficient ventilating means composed of a relatively few simple parts capable of being inexpensively manufactured, assembled and installed.

The invention provides for simplifying and reducing the cost of installation and manufacture of ventilating systems without sacrificing efficiency in the operation thereof, by providing a construction rendering it unnecessary to use separate or especially formed regulars, and also obviating the necessity of employing window panels of special design.

Another object of this invention resides in the provision of vehicle body ventilating means of the type previously set forth operable to not only exhaust stale air from within the body, but to also provide for the entrance of a limited amount of fresh air into the body. This latter feature adds materially to the efficiency of the ventilating system, and in accordance with the present invention is accomplished in an extremely simple manner.

Another advantageous feature of this invention resides in the provision of a ventilating system for vehicle bodies having means preventing rain, insects and other foreign matter from entering the interior of the body through the ventilating system.

A further object of this invention resides in the provision of a ventilating system possessing all of the foregoing advantages and capable of being readily attached to vehicle bodies of conventional design without materially changing or otherwise interferring with the body structure. This feature is of particular importance, since it permits the ventilating system to be sold as an accessory at a nominal cost.

In addition to the foregoing, the present invention contemplates a ventilating system embodying means for independently controlling the amount of air exhausted from the body and the amount of air entering the body. With this latter construction various degrees of ventilation may be obtained by merely relatively adjusting the means controlling the exhaust and intake air passages of the ventilating system.

A still further advantageous feature of this invention resides in the provision of means associated with the air intake opening of the system for deflecting the air upwardly toward the roof of the body. This feature is desirable, since it prevents the incoming air from contacting directly with the occupants of the vehicle.

The foregoing, as well as other objects, will be made more apparent as this description proceeds, especially when considered in connection with the accompanying drawings, wherein.

Figure 1:
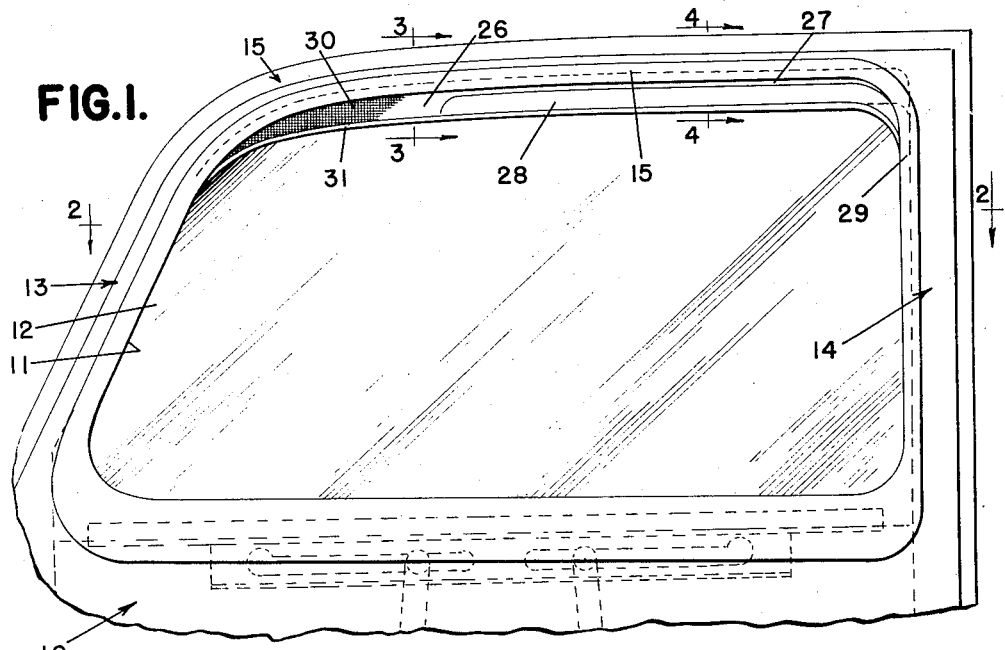
Figure 1 is a fragmentary side elevational view of a vehicle body equipped with a ventilating system constructed in accordance with this invention.
Figure 2:
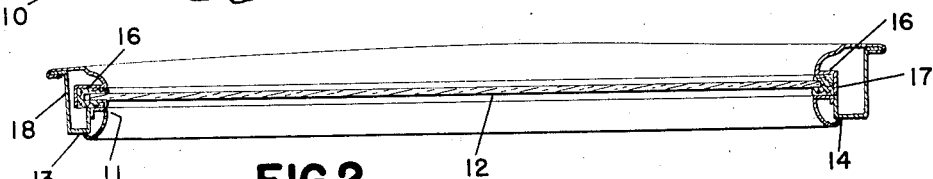
Figure 2 is a longitudinal sectional view taken substantially on the plane indicated by the line 2—2 on Figure 1, and showing the location of the forward edge of the glass panel relative to its guide when the panel is lowered to its ventilating position.
Figure 3:
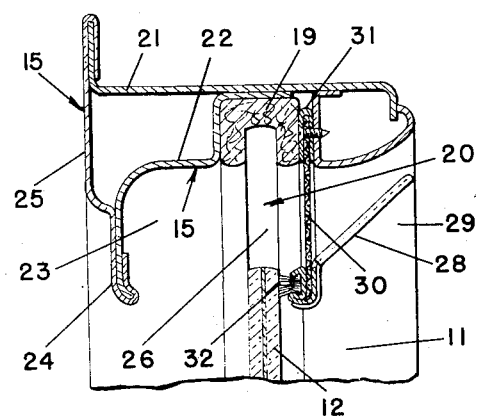
Figure 4:
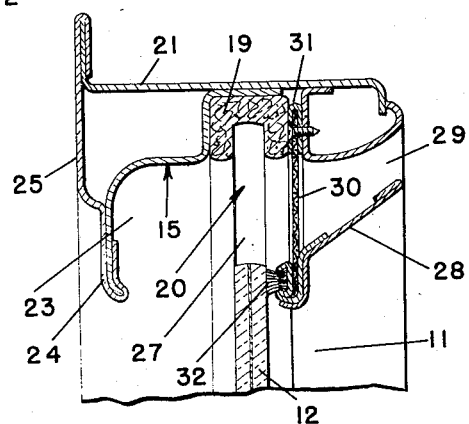

Figures 3 and 4 are, respectively, cross sectional views taken on the lines 3—3 and 4—4 on Figure 1;

Figure 5 is a view similar to Figure 1 showing a slightly modified form of construction;

Figures 6, 7, and 8, are, respectively, cross sectional views taken on the lines 6—6, 7—7, and 8—8 on Figure 5;

Figure 9 is also a view similar to Figure 1 showing still another modified form of construction;

Figures 10 and 11 are, respectively, cross sectional views taken on the lines 10—10 and 11—11 on Figure 9; and Figure 12 is a fragmentary cross sectional view featuring a further modification of the present invention.

Referring first to the embodiment of the invention featured in Figures 1 to 4 inclusive, it will be noted that there is illustrated in Figure 1 a portion of a vehicle body 10 having a window opening 11 normally closed by a glass panel 12 mounted in the usual manner in the body for movement from a position within the window opening to a position within a compartment formed in the body below the window opening.

The front end of the window opening is defined by a pillar 13 inclined rearwardly from the lower end thereof, and the rear end of the opening is defined by a vertical pillar 14 connected at its upper end to the corresponding end of the front pillar 13 by means of a header 15. In accordance with this invention, the glass panel 12 is constrained to move relative to the window opening 11 in the direction of the vertical pillar 14 and is guided throughout this movement by a runway 16 substantially channel-shaped in cross section. The rear section 17 of the runway 16 is secured to the vertical pillar 14, while the front section 18 of the runway is fixed to the inclined pillar 13 and is connected at its upper end to the corresponding end of the section 17 by the section 19. The latter section is secured to the header 15 and receives the upper edge of the glass panel when the latter is in its raised position.

Inasmuch as the glass panel is compelled to move in the direction of the vertical pillar 14, and in view of the fact that the front pillar 13 is inclined with respect to the pillar 14, it necessarily follows that the forward edge of the panel will move laterally inwardly with respect to the base portion of the channel-shaped runway 18 when the panel is being lowered with respect to the window opening. With the type of ventilating system about to be described, it is desirable to maintain the forward edge of the glass panel in the channel section 18 of the runway throughout a limited extent of downward movement of the panel, and this is accomplished herein by increasing the depth of the channel portion 18 to such an extent that when the glass panel is open to the degree required to secure ventilation, the forward edge of the panel will remain in the channel section 18.

In Figures 1 to 4 inclusive, the glass panel 12 is shown as lowered to the extent required for proper ventilation and in order to provide for exhausting the stale air within the body through the opening 20 and to also permit the entrance of fresh air into the body through this opening, the construction featured in Figures 3 and 4 is resorted to. As shown in these latter figures, the header 15 comprises a top rail 21 and a strip 22 fashioned to form a downwardly opening pocket 23 opposite the opening 20 at the outer side thereof. In detail, the upper longitudinal edge of the strip 22 is bent to form an inwardly opening recess for receiving the top section 19 of the runway and the lower marginal edge portion of the strip is offset outwardly with respect to the runway, forming a baffle 24. The baffle 24 is situated directly opposite the opening 20 and is of sufficient width to conceal this opening from the outer side of the vehicle. The space between the rail and strip 22 is enclosed by a finishing strip 25 having the lower marginal edge crimped around the corresponding edge of the baffle and having the upper marginal edge similarly secured to an upstanding flange on the outer edge of the rail.

Assuming that the glass panel has been lowered to the position thereof shown in Figure 3, and that the vehicle is in motion, it will be noted that the air passing over the free edge portion of the baffle adjacent the forward end portion 26 of the opening 20 will create a low pressure area in the forward portion of the pocket 23 sufficient to draw air out of the vehicle body through the portion 26 of the opening 22. After the air has passed over the aforesaid edge portion of the baffle in the manner previously set forth, the same flows inwardly toward the glass panel 12, and in so doing enters the vehicle body through the rear portion 27 of the opening 20. The entrance of water and other foreign matter directly into the body is, of course, prevented by the baffle 24, since the latter not only forms the pocket previously discussed, but also conceals the opening 20 from the outer side of the vehicle body.

It has been stated above that the air passing around the forward end of the vehicle will enter the portion of the pocket 23 adjacent the rear end portion 27 of the opening 20, and in order to prevent this air from contacting directly with the occupants of the vehicle I provide a deflector 28 secured to the finishing molding 29 at the inner side of the window opening through the medium of a suitable screen 30. As shown particularly in Figure 4, the screen 30 is positioned upon the inner side of the window opposite the opening 20 and is provided with a frame 31. The upper longitudinal bar of the frame is secured to the corresponding portion of the finishing molding 29, and the lower bar of the frame is fashioned to secure a buffer 32 in a position to engage the inner side of the window panel and form a seal between the latter and the lower bar of the screen frame. The deflector 28 is secured to the lower bar of the screen frame at the inner side of the latter and is inclined upwardly in the manner shown in Figure 4 to direct the air toward the roof of the vehicle body. The construction is such that the deflector 28, screen assembly 30, and buffer 32 form a unit with the finishing molding 29 capable of being readily assembled and installed in the vehicle body.

The embodiment of the invention featured in Figures 5 to 8 inclusive is similar to the construction previously described, and accordingly, the parts of this embodiment corresponding to those previously referred to will be identified by the same reference characters, only primed, so as to enable them to be distinguished from those used in describing the foregoing modification. The principal difference in the two constructions is that in the embodiment disclosed in Figures 5 to 8 inclusive, the forward inclined edge of the glass panel 12' is permitted to travel out of the adjacent runway upon initial lowering of the panel so as to provide an inclined opening 33 at the forward edge of the panel, as well as at the top thereof. The opening 33 supplements the portion 26' of the opening 20' in forming an exhaust for the air within the vehicle body, and in some cases may be desirable to secure the proper ventilation.

As shown particularly in Figure 6, provision is made for protecting the opening 33 to such an extent as to prevent insects, water and other foreign matter from passing into the vehicle body. In detail, the pillar 13' is provided with a rearwardly extending flange 34 spaced laterally outwardly from the window opening and curved inwardly to provide a lip directly opposite the opening 33 and having a width approximating the width of this latter opening. It will, of course, be apparent that the air flowing over the lip will be directed toward the glass panel 12' at a point spaced a substantial distance in rear of the opening 33 and thereby cause a low pressure opposite the opening 33 sufficient to withdraw air out of the vehicle body. The entrance of insects and other foreign matter into the body through the opening 33 is prevented by means of a screen assembly 30' exactly the same as the one described in connection with the first embodiment of this invention.

The embodiment of the invention featured in Figures 9 to 11 inclusive is similar to the first described form of the invention insofar as the particular construction of the header 15" and pillars is concerned. However, the ventilating means proper is of different construction and will be described in detail. In the present embodiment of the invention, ventilation may be secured without lowering or otherwise interfering with the glass panel 12", and moreover, the degree of ventilation may be regulated to suit different conditions. In detail, the top section 19"

of the runway 16" is spaced below the header 15 a distance substantially equal to the width of the baffle 24" and the ventilating means is disposed within the space thus provided. The ventilating means comprises a damper 40 for regulating the amount of air withdrawn from the vehicle body through the space 41 and is pivotally supported in any suitable manner between the top and bottom edges thereof, for horizontal swinging movement. The pivotal support may be any one of a number of designs, but is preferably of the friction type so as to permit maintaining the damper in its various adjusted positions. Movement of the damper 40 beyond its closed position is restricted by suitable resilient buffers 42 fashioned to perform the additional function of preventing the escape of air around the damper when in its closed position.

The space designated herein by the reference character 43 in rear of the space 41 functions to permit the air passing over the exhaust space 41 to enter the vehicle body and is also controlled by an adjustable damper. This damper is identified in Figure 11 by the reference character 44 and is suitably pivotally supported upon the runway 19" adjacent the inner edge thereof, for swinging movement inwardly with respect to the space 43. This pivotal connection is also preferably of the friction type so as to provide for maintaining the damper in any one of its several adjusted positions. The upper swinging edge of the damper 44 is adapted to engage an abutment 45 forming a continuation of the abutment for the upper edge of the damper 40 and suitably secured to a filling strip 46 for the space between the strip 22" and the finishing molding 29".

The baffles previously described are independently adjustable, and accordingly, the amount of air exhausted from the vehicle body through the space 41, and the amount of air entering the body through the space 43 may be proportioned until the desired degree of ventilation is secured. As in the foregoing embodiments of the invention, insects and other foreign matter are prevented from escaping into the body, when either or both of the ventilators are open, by a screen 47 extending opposite both the opening 42 and the opening 43 and having the upper and lower marginal edge portions respectively secured to the filler strip 46 and the guide section 19".

The basic principles of the ventilating systems, previously discussed, are so simple as to permit the same to be embodied in an accessory capable of being readily attached to vehicle bodies of conventional design. In order to illustrate one practical application of the present invention to vehicles of conventional design, I have selected the modification featured in Figure 12. In detail, I have shown in Figure 12, a window opening header 50 of a conventional vehicle body having a portion 51 bent to form a recess within which the upper section 52 of a window guide is secured for receiving the top edge portion of a glass panel 53 also of conventional design.

In detail, a downwardly opening pocket 54 is provided at the outer side of the window adjacent the top thereof, and this pocket is formed by a strip 55 of angular cross section attached to the body with the flange 56 engaging the underside of the header and with the other flange 57 extending downwardly from the outer edge of the flange aforesaid to form the pocket 54. The construction is such that when the glass panel 53 is lowered to a position wherein the upper edge of the same is opposite the lower edge of the flange 57, an opening 59 is provided similar to the opening 22 hereinbefore described, in that the forward portion of the same will permit the stale air to pass out of the vehicle body and will permit fresh air from the exterior of the body to enter the latter. The action of the air with the present construction will be the same as described in connection with the first embodiment of this invention, and accordingly, will not be defined in detail.

The entrance of insects and other foreign matter into the body of the vehicle through the opening 59 may be prevented by a screen 60 having the upper marginal edge secured to the flange 56 of the angle strip 55 and having the lower marginal edge suitably secured to the side walls of the strip 55. If desired, a buffer 61 may be secured to the lower edge of the screen for engagement with the outer side of the window panel 53 to form a seal between the screen and panel. Thus it will be observed that the screen 60 and buffer 61 form a unit with the member 55 capable of being readily attached to the header 50.

In the event it is desired to deflect the air passing into the vehicle body toward the roof of the latter, as in the first described form of the invention, a deflector 62 may be provided. As shown in Figure 12, the ends of the deflector 62 are secured to the finishing molding 63 usually provided at the inner side of the window opening. The lower marginal edge of the deflector may be fashioned to support a buffer 64 for engaging the inner side of the window panel, and thereby cooperate with the buffer 61 in stabilizing the panel when the latter is in the position thereof shown in Figure 12. This latter arrangement is of particular importance in cases where the forward edge of the glass panel is unsupported in its open position.

From the foregoing, it will be observed that highly efficient ventilation of a vehicle body may be secured by various constructions composed of a relatively few simple parts and capable of being inexpensively manufactured, assembled and installed. It will also be apparent that all of the specific constructions previously described for the purpose of illustrating this invention are capable of effecting efficient ventilation without the necessity of providing especially formed regulators or window panels, and also without the necessity of appreciably altering the sheet metal work of the body.

What I claim as my invention is:

1. In a ventilating system for a vehicle body having a window opening and having a header defining the top of the window opening, a vertically slidable closure for the window opening movable downwardly to form a ventilating slot at the top of the window opening, a member attachable to the header at the outer side of the window opening and having a portion extending downwardly into the window opening opposite the ventilating slot, a molding at the inner side of the window opening and a deflector forming a unit with said molding and operable to direct air flowing through the slot upwardly toward the top of the body.

2. In a ventilating system for a vehicle body having a window opening and having a header defining the top of the window opening, a vertically slidable closure for the window opening movable downwardly to form a ventilating slot at the top of the window opening, a member attachable to the header at the outer side of the window opening and having a portion extending downwardly into the window opening opposite the ventilating slot, a flange extending inwardly from the upper end of said member toward the window opening in overlapping relation to the header, a screen attachable to the flange adjacent the inner edge thereof in close proximity to said slidable closure and extending the full length of the window opening, a buffer attached to the lower edge of the screen and engageable with the outer side of the slidable closure adjacent its upper edge, a molding at the inner side of the window opening and a deflector forming a unit with said molding and operable to direct air flowing through the slot upwardly toward the top of the body.

3. In a ventilating system for a vehicle body having a window opening and having a header defining the top of the window opening, a vertically slidable closure for the window opening movable downwardly to form a ventilating slot at the top of the window opening, a member attachable to the header at the outer side of the window opening and having a portion extending downwardly into the window opening opposite the ventilating slot, a screen for the ventilating slot secured to said member, a molding at the inner side of the window opening and a deflector forming a unit with said molding and operable to direct air flowing through the slot upwardly towards the top of the body, a buffer attached to the lower inner end of said deflector engageable with the inner side of the slidable closure adjacent its upper edge.

4. In a ventilating system for a vehicle body having a window opening and having a header defining the top of the window opening, a vertically slidable closure for the window opening movable downwardly to form a ventilating slot at the top of the window opening, a member attachable to the header at the outer side of the window opening and having a portion extending downwardly into the window opening opposite the ventilating slot, a flange extending inwardly from the upper end of said member toward the window opening in overlapping relation to the header, a screen attachable to the flange adjacent the inner edge thereof in close proximity to said slidable closure and extending the full length of the window opening, a buffer attached to the lower edge of the screen and engageable with the outer side of the slidable closure adjacent its upper edge, a molding at the inner side of the window opening and a deflector forming a unit with said molding and operable to direct air flowing through the slot upwardly toward the top of the body, a buffer attached to the lower inner side of said deflector engageable with the inner edge of said slidable closure.

BENJAMIN A. WOINA.